US010172060B2

(12) United States Patent
Raghunathan et al.

(10) Patent No.: US 10,172,060 B2
(45) Date of Patent: Jan. 1, 2019

(54) RESELECTION FAILURE DETECTION AND PREVENTION IN MULTI-SIM WIRELESS COMMUNICATION DEVICES

(71) Applicant: QUALCOMM Incorporated, San Diego, CA (US)

(72) Inventors: Shravan Kumar Raghunathan, San Diego, CA (US); Muthukumaran Dhanapal, San Diego, CA (US); Parthasarathy Krishnamoorthy, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 270 days.

(21) Appl. No.: 15/145,581

(22) Filed: May 3, 2016

(65) Prior Publication Data
US 2017/0325144 A1 Nov. 9, 2017

(51) Int. Cl.
H04W 36/16 (2009.01)
H04W 36/30 (2009.01)
H04W 36/36 (2009.01)
H04W 48/06 (2009.01)
H04W 36/24 (2009.01)
H04W 48/02 (2009.01)

(52) U.S. Cl.
CPC ......... *H04W 36/16* (2013.01); *H04W 36/245* (2013.01); *H04W 36/30* (2013.01); *H04W 36/36* (2013.01); *H04W 48/06* (2013.01); *H04W 48/02* (2013.01)

(58) Field of Classification Search
CPC ..... H04W 88/06; H04W 48/16; H04W 48/18; H04W 48/02; H04W 48/20; H04W 48/04; H04W 60/005; H04W 8/18; H04W 68/02; H04W 16/14; H04W 36/0061; H04W 36/14; H04W 36/24; H04W 48/06
See application file for complete search history.

(56) References Cited

U.S. PATENT DOCUMENTS 5,999,811 A * 12/1999 Molne ................... H04W 48/16
379/357.01
6,931,253 B1 * 8/2005 Hartikainen .......... H04W 72/10
455/450

(Continued)

FOREIGN PATENT DOCUMENTS

WO 2013066123 A1 5/2013

OTHER PUBLICATIONS

International Search Report and Written Opinion—PCT/US2017/028914—ISA/EPO—dated Jul. 25, 2017.

(Continued)

*Primary Examiner* — Matthew C Sams
(74) *Attorney, Agent, or Firm* — Paradice and Li LLP/Qualcomm

(57) ABSTRACT

Examples described herein relate to managing reselection for a wireless communication device having a first subscription associated with a first Radio Access Technology (RAT) and a second subscription associated with a second RAT, including determining an occurrence of a barring procedure that bars a target cell or a target frequency for the first subscription for a barring duration and deprioritizing the target cell or the target frequency for the barring duration on the second subscription.

30 Claims, 9 Drawing Sheets

(56) References Cited

U.S. PATENT DOCUMENTS

| | | | | |
|---|---|---|---|---|
| 8,874,167 B2* | 10/2014 | Qiu | ............... | H04W 48/18 370/329 |
| 9,131,429 B1* | 9/2015 | Bharadwaj | ............... | H04W 4/90 |
| 9,439,143 B2* | 9/2016 | Kim | ............... | H04W 76/18 |
| 10,034,207 B2* | 7/2018 | Jung | ............... | H04W 36/06 |
| 2005/0176466 A1* | 8/2005 | Verloop | ............... | H04W 48/18 455/558 |
| 2006/0084443 A1* | 4/2006 | Yeo | ............... | H04W 36/0061 455/449 |
| 2007/0037577 A1* | 2/2007 | Dalsgaard | ............... | H04W 48/04 455/436 |
| 2010/0159990 A1* | 6/2010 | Johnstone | ............... | H04W 48/04 455/561 |
| 2010/0216469 A1* | 8/2010 | Yi | ............... | H04W 48/20 455/435.3 |
| 2010/0291941 A1* | 11/2010 | Chen | ............... | H04W 36/22 455/450 |
| 2012/0140709 A1* | 6/2012 | Hou | ............... | H04W 56/0015 370/328 |
| 2012/0264425 A1* | 10/2012 | Krishnamoorthy | ... | H04W 48/16 455/434 |
| 2013/0084892 A1* | 4/2013 | Teyeb | ............... | H04W 4/023 455/456.6 |
| 2013/0203417 A1* | 8/2013 | Ramachandran | ..... | H04W 36/06 455/436 |
| 2013/0231105 A1* | 9/2013 | Bai | ............... | H04W 48/18 455/426.1 |
| 2013/0303114 A1* | 11/2013 | Ahmad | ............... | H04W 16/14 455/406 |
| 2013/0322234 A1* | 12/2013 | Mohseni | ............... | H04W 48/16 370/221 |
| 2014/0024382 A1* | 1/2014 | Zou | ............... | H04W 16/08 455/445 |
| 2014/0148168 A1* | 5/2014 | Aoyagi | ............... | H04W 48/12 455/436 |
| 2014/0153485 A1* | 6/2014 | Tsuda | ............... | H04W 48/04 370/328 |
| 2014/0155063 A1* | 6/2014 | Koide | ............... | H04W 48/02 455/434 |
| 2014/0198640 A1* | 7/2014 | Suzuki | ............... | H04L 47/76 370/230 |
| 2014/0355463 A1* | 12/2014 | Smith | ............... | H04M 15/60 370/252 |
| 2014/0355570 A1* | 12/2014 | Smith | ............... | H04W 36/0072 370/332 |
| 2015/0017968 A1* | 1/2015 | Kaikkonen | ............... | H04W 8/20 455/418 |
| 2015/0257088 A1 | 9/2015 | Hsu et al. | | |
| 2015/0373531 A1* | 12/2015 | Goel | ............... | H04W 8/186 370/328 |
| 2016/0021660 A1* | 1/2016 | Krishnamurthy | ............... | H04W 72/0453 455/452.1 |
| 2016/0029276 A1* | 1/2016 | Ye | ............... | H04W 48/02 455/436 |
| 2016/0127969 A1* | 5/2016 | Pao | ............... | H04W 48/20 455/437 |
| 2016/0157172 A1* | 6/2016 | Jeong | ............... | H04W 76/14 370/329 |
| 2016/0286445 A1* | 9/2016 | Jung | ............... | H04W 36/06 |
| 2017/0034745 A1* | 2/2017 | Dhanapal | ............... | H04W 76/18 |
| 2017/0048773 A1* | 2/2017 | Miao | ............... | H04W 8/183 |
| 2017/0208603 A1* | 7/2017 | Goel | ............... | H04W 36/14 |
| 2017/0289958 A1* | 10/2017 | Dev | ............... | H04W 52/00 |
| 2017/0325144 A1* | 11/2017 | Raghunathan | ........ | H04W 36/16 |

OTHER PUBLICATIONS

"Third Generation Partnership Project; Technical Specification Group Radio Access Network Evolved Universal Terrestrial Radio Access (E-UTRA); User Equipment (UE) Procedures in Idle Mode (Release 13)"; 3GPP TS 36.304, vol. RAN WG2, No. V13.1.0, Mar. 30, 2016, XP051088473, pp. 1-43.

* cited by examiner

| RANK | CELL |
|---|---|
| 1 | FIRST NEIGHBOR CELL 180 |
| 2 | SECOND NEIGHBOR CELL 190 |
| ... | ... |
| n | TARGET CELL 170 |

| BLACKLIST | |
|---|---|
| CELL | |
| PCI | CELL_ID |
| TARGET CELL 170 | |

500b
| PRIORITY | CELL |
|---|---|
| n | FREQUENCY A |
| n-1 | FREQUENCY B |
| ⋮ | ⋮ |
| -1 | TARGET FREQUENCY |
*FIG. 5B*
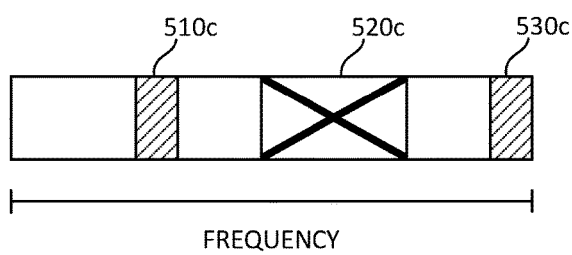
*FIG. 5C*
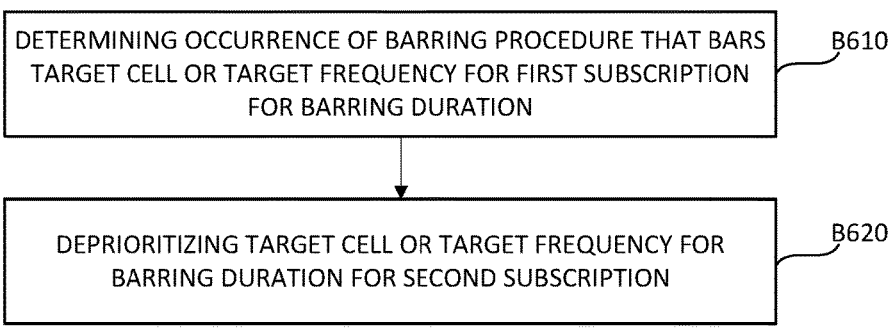
*FIG. 6*

RESELECTION FAILURE DETECTION AND PREVENTION IN MULTI-SIM WIRELESS COMMUNICATION DEVICES

BACKGROUND

A wireless communication device, such as a mobile phone device or a smart phone, may include two or more Subscriber Identity Modules (SIMs). Each SIM may correspond to at least one subscription via a Radio Access Technology (RAT). Such a wireless communication device may be a multi-SIM wireless communication device. In a Multi-SIM-Multi-Active (MSMA) wireless communication device, all SIMs may be active at the same time. In a Multi-SIM-Multi-Standby (MSMS) wireless communication device, if any one SIM is active, then the rest of the SIM(s) may be in a standby mode. The RATs may include, but are not limited to, Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Wideband Code Division Multiple Access (WCDMA), Long Term Evolution (LTE), High-Speed Downlink Packet Access (HSDPA), and the like), Global System for Mobile Communications (GSM), Code Division Multiple Access 1× Radio Transmission Technology (1×), General Packet Radio Service (GPRS), Wi-Fi, Personal Communications Service (PCS), and other protocols that may be used in a wireless communications network or a data communications network.

A multi-SIM wireless communication device may have a first subscription enabled by a first RAT and a second subscription enabled by a second RAT. In some cases, the first RAT and the second RAT may be the same. Illustrating with a non-limiting example, each of the first RAT and the second RAT may be LTE. Cell reselection failures on a particular target cell or particular target frequency for the first subscription may result in the target cell or target frequency being barred or in forbidden Track Area (TA) for a period of time. Nevertheless, the target cell or target frequency can be a strong candidate with relatively high signal strength for reselection or handover procedures.

In a scenario in which the second subscription is camped on a same Public Land Mobile Network (PLMN) as the first subscription, it can be possible that cell searches and measurements performed with respect to the second subscription on the target cell or target frequency would similarly result in cell reselection or handover failure.

SUMMARY

Examples described herein relate to managing cell reselection or handover for a multi-Subscriber Identity Module (SIM) wireless communication device having a first subscription and a second subscription. Particular, in response to determining that a barring procedure has occurred and that the first subscription and the second subscription are both camped on a same Public Land Mobile Network (PLMN), the wireless communication device may transfer a barring duration from a first software layer associated with the first subscription to a second software layer associated with the second subscription.

With respect to the second subscription, the wireless communication device may perform cell-based or frequency-based de-prioritization depending on a mode or state of the second subscription. For instance, if the second subscription is in an idle mode, the wireless communication device may perform cell-based de-prioritization for the second subscription by lowering a rank of the target cell (e.g., ranking the target cell as a lowest option) for cell searches and measurements for the barring duration. In addition, if the second subscription is in the idle mode, the wireless communication device may perform frequency-based de-prioritization for the second subscription by lowering a cell reselection priority of the target frequency (e.g., by setting the cell reselection priority of the target frequency as −1) for the barring duration.

If the second subscription is in a connected mode, the wireless communication device may perform cell-based de-prioritization by forbidding any measurements in the connected mode for the target cell for the barring duration. For instance, the wireless communication device may Blacklist the target cell by adding a Primary Cell Index (PCI) identifying the target cell to a BlackListAddModList. The wireless communication device may perform frequency-based de-prioritization by forbidding any measurements in the connected mode for the target frequency. For instance, the wireless communication device may prune out the target frequency from supported frequencies for performing measurements in the connected mode.

In various examples, the serving/neighbor frequency or the first RAT may be deprioritized (e.g., via any feature in Connection rejection Over-the-Air (OTA) according to 3GPP Rel 9 De-prioritization) on the first subscription due to network congestion for a barring duration. If the first subscription and the second subscription are both camped on a same PLMN, such information can be transferred from the first subscription to the second subscription. The wireless communication device may deprioritize the serving/neighbor frequency or the second RAT (which is the same as the first RAT) for the second subscription. The de-prioritization procedures performed on the second subscription may match that of the first subscription.

In various examples, a method for managing cell reselection for a wireless communication device having a first subscription associated with a first SIM and a second subscription associated with a second SIM includes determining an occurrence of a barring procedure that bars a target cell or a target frequency for the first subscription, determining a mode associated with the second subscription, and deprioritizing the target cell or target frequency based on the mode.

In some examples, the method further includes determining a barring duration in which the target cell or the target frequency is forbidden to be considered for a reselection procedure for the first subscription.

In some examples, the mode associated with the second subscription is determined to be an idle mode.

In some examples, deprioritizing the target cell or the target frequency includes deprioritizing the target cell by lowering a rank associated with the target cell for cell searches and measurements for the barring duration.

In some examples, the rank associated with the target cell is set to be a lowest option for cell searches and measurements for the barring duration.

In some examples, deprioritizing the target cell or the target frequency includes deprioritizing the target frequency by lowering a cell reselection priority of the target frequency for the barring duration.

In some examples, the cell reselection priority of the target frequency is set to be a lowest option for the barring duration.

In some examples, the mode associated with the second subscription is determined to be a connected mode.

In some examples, deprioritizing the target cell or the target frequency includes deprioritizing the target cell by Blacklisting the target cell to forbid measurements in the connected mode for the barring duration.

In some examples, Blacklisting the target cell for measurements in the connected mode includes adding a PCI identifying the target cell into a BlackListAddModList.

In some examples, deprioritizing the target cell or the target frequency includes deprioritizing the target frequency by pruning out the target frequency for measurements in the connected mode for the barring duration.

In some examples, the method further includes determining whether a first PLMN associated with the first subscription is the same as a second PLMN associated with the second subscription, and transferring the barring duration from a first software layer associated with the first subscription to a second software layer associated with the second subscription in response determining that the first PLMN is the same as the second PLMN.

In some examples, the first RAT and the second RAT are the same RATs.

In some examples, the method further includes determining that the first subscription is being deprioritized and deprioritizing the second subscription.

In some examples, the method further includes determining whether a first PLMN associated with the first subscription is the same as a second PLMN associated with the second subscription and transferring information related to the first subscription being deprioritized from a first software layer associated with the first subscription to a second software layer associated with the second subscription in response determining that the first PLMN is the same as the second PLMN.

In some examples, the first SIM corresponds to a first RAT. The second SIM corresponds to a second RAT. Each of the first RAT and the second RAT is Long Term Evolution (LTE).

According to some examples, a wireless communication device includes at least one radio frequency (RF) resource, a processor configured to connect to a first SIM associated with a first subscription and to a second SIM associated with a second subscription, and configured to determine an occurrence of a barring procedure that bars a target cell or a target frequency for the first subscription determine a mode associated with the second subscription, and deprioritize the target cell or target frequency based on the mode, and a memory.

In some examples, the processor is further configured to determine a barring duration in which the target cell or the target frequency is forbidden to be considered for a reselection procedure for the first subscription.

In some examples, the mode associated with the second subscription is determined to be an idle mode.

In some examples, the processor deprioritizes the target cell or the target frequency by deprioritizing the target cell by lowering a rank associated with the target cell for cell searches and measurements for the barring duration.

In some examples, the rank associated with the target cell is set to be a lowest option for cell searches and measurements for the barring duration.

In some examples, the processor deprioritizes the target cell or the target frequency by deprioritizing the target frequency by lowering a cell reselection priority of the target frequency for the barring duration.

In some examples, the cell reselection priority of the target frequency is set to be a lowest option for the barring duration.

In some examples, the mode associated with the second subscription is determined to be a connected mode.

In some examples, the processor deprioritizes the target cell or the target frequency by deprioritizing the target cell by Blacklisting the target cell to forbid measurements in the connected mode for the barring duration.

In some examples, the processor Blacklists the target cell for measurements in the connected mode by adding a PCI identifying the target cell into a BlackListAddModList.

In some examples, a method for managing reselection for a wireless communication device having a first subscription associated with a first RAT and a second subscription associated with a second RAT includes determining an occurrence of a barring procedure that bars a target cell or a target frequency for the first subscription for a barring duration, and deprioritizing the target cell or the target frequency for the barring duration on the second subscription.

In some examples, a method for managing reselection for a wireless communication device having a first subscription associated with a first RAT and a second subscription associated with a second RAT includes determining that a frequency or the first RAT is being deprioritized on the first subscription for a barring duration, determining whether a first PLMN associated with the first subscription is the same as a second PLMN associated with the second subscription, and deprioritizing, on the second subscription, the frequency or the second RAT in response to determining that the first PLMN and the second PLMN are the same.

In some examples, the first RAT and the second RAT and the same.

In some examples, the frequency or the first RAT is deprioritized due to network congestion.

BRIEF DESCRIPTION OF THE DRAWINGS

The accompanying drawings, which are incorporated herein and constitute part of this specification, illustrate examples of the disclosure, and together with the general description given above and the detailed description given below, serve to explain the features of the various examples.

FIG. 4B is a table illustrating an example of priority ranks of neighbor cells for cell searches and measurements for the second subscription in some examples.

FIG. 4C is a table illustrating an example of a list of forbidden neighbor cells for the second subscription in some examples.

FIG. 5B is a table illustrating an example of priority levels of frequencies for the second subscription in some examples.

FIG. 5C is a diagram illustrating an example of frequency pruning for the second subscription in some examples.

FIG. 6 is a process flowchart diagram illustrating an example of a reselection management method according to various examples.

DETAILED DESCRIPTION

Figure 1:
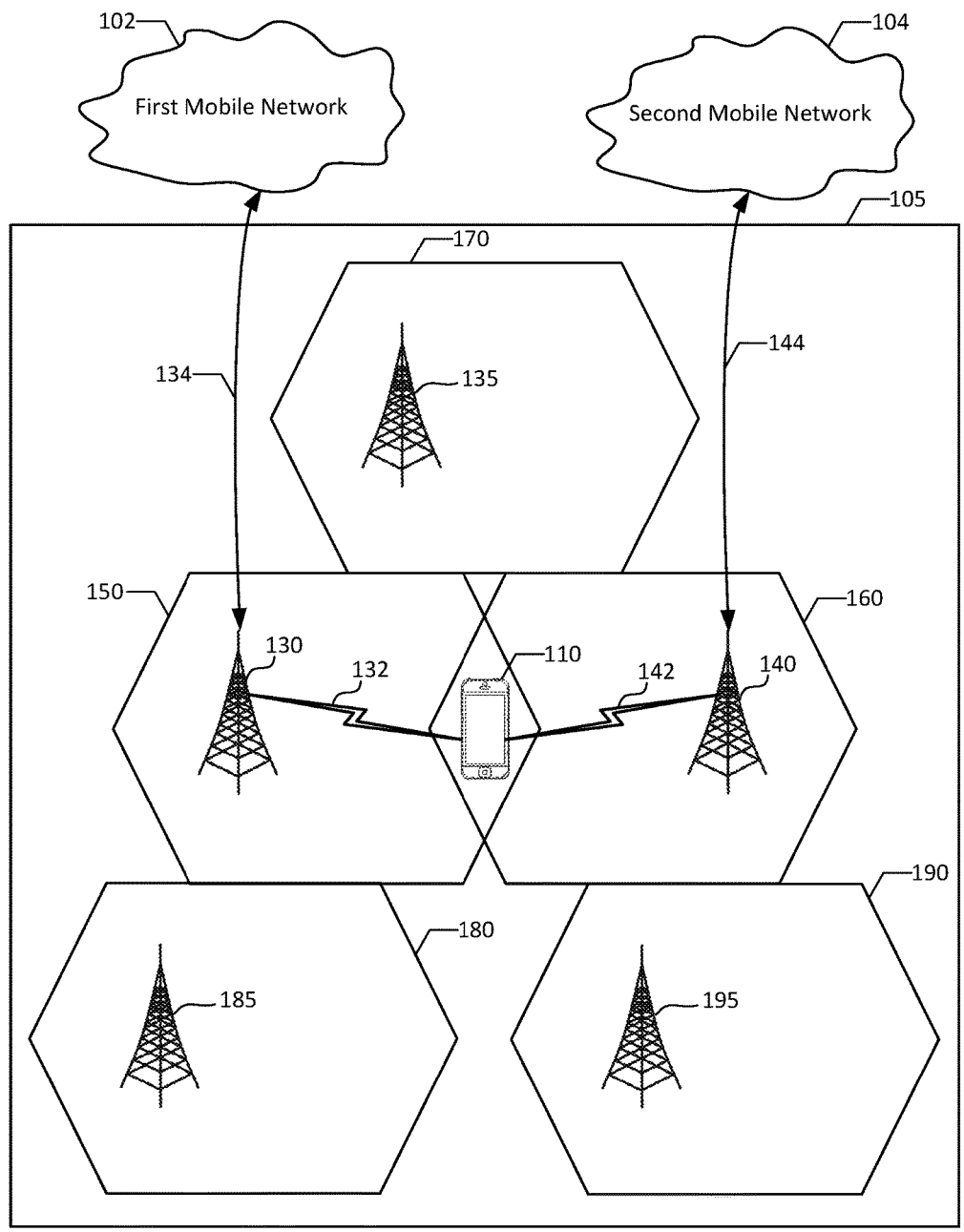
FIG. 1 is a schematic diagram of a communication system in accordance with various examples.

Various examples will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

Some modern communication devices, referred to herein as a wireless communication device, User Equipment (UE), or Mobile Station (MS), may include any one or all of cellular telephones, smart phones, personal or mobile multimedia players, personal data assistants, laptop computers, personal computers, tablet computers, smart books, palmtop computers, wireless electronic mail receivers, multimedia Internet-enabled cellular telephones, wireless gaming controllers, and similar personal electronic devices. Such a wireless communication device may include at least one Subscriber Identity Module (SIM), a programmable processor, memory, and circuitry for connecting to two or more mobile communication networks.

A wireless communication device may include one or more SIMs that provide users of the wireless communication devices with access to one or multiple separate mobile communication networks. The mobile communication networks may be supported by Radio Access Technologies (RATs). The wireless communication device may be configured to connect to one or more base stations via one or more RATs. Examples of RATs may include, but not limited to, Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Wideband Code Division Multiple Access (WCDMA), Long Term Evolution (LTE), High-Speed Downlink Packet Access (HSDPA), and the like), Global System for Mobile Communications (GSM), Code Division Multiple Access 1× Radio Transmission Technology (1×), General Packet Radio Service (GPRS), Wi-Fi, Personal Communications Service (PCS), and other protocols that may be used in a wireless communications network or a data communications network. Each RAT may be associated with a subscription or SIM.

A wireless communication device provided with a plurality of SIMs and connected to two or more subscriptions or networks with one subscription or network being active at a given time is a Multi-SIM-Multi-Standby (MSMS) communication device. In one example, the MSMS communication device may be a Dual-SIM-Dual-Standby (DSDS) communication device, which may include two SIMs that may both be active on standby, but one is deactivated when the other one is in use. In another example, the MSMS communication device may be a Triple-SIM-Triple-Standby (TSTS) communication device, which includes three SIMs that may all be active on standby, where two may be deactivated when the third one is in use. In other examples, the MSMS communication device may be other suitable multi-SIM communication devices, with, for example, four or more SIMs, such that when one is in use, the others may be deactivated.

On the other hand, a wireless communication device that includes a plurality of SIMs and connects to two or more subscriptions or networks with two or more subscriptions or networks being active at a given time may be a MSMA communication device. An example MSMA communication device may be a Dual-SIM-Dual-Active (DSDA) communication device, which may include two SIM. Both SIMs may remain active. In another example, the MSMA device may be a Triple-SIM-Triple-Active (TSTA) communication device, which may include three SIM. All three SIMs may remain active. In other examples, the MSMA communication device may be other suitable multi-SIM communication devices with four or more SIMs, all of which may be active.

Generally, examples described herein may be applicable to a MSMS wireless communication device or a MSMA wireless communication device having at least a first SIM and a second SIM, where the first SIM employs a same RAT as the second SIM. Illustrating with a non-limiting example, the first SIM may employ a first RAT, and the second SIM may employ a second RAT. Each of the first RAT and the second RAT may be LTE. The current examples may likewise be implemented with respect to any other types of RATs as long as the first RAT and the second RAT are the same.

As used herein, the terms "SIM," "SIM card," and "subscriber identification module" may be used interchangeably to refer to a memory that may be an integrated circuit or embedded into a removable card, and that stores an International Mobile Subscriber Identity (IMSI), related key, and/or other information used to identify and/or authenticate a wireless device on a network and enable communication services with the network. Because the information stored in a SIM may be the wireless device to establish a communication link for a particular communication service with a particular network, the term "SIM" may also be used herein as a shorthand reference to the communication service (e.g., the networks, the subscriptions, the services, and/or the like) associated with and enabled by the information (e.g., in the form of various parameters) stored in a particular SIM as the SIM and the communication network, as well as the services and RATs supported by that network, correlate to one another.

Various examples may be implemented within a communication system 100, an example of which is illustrated in FIG. 1. Referring to FIG. 1, a first mobile network 102 and a second mobile network 104 may each associate with a plurality of cellular base stations (e.g., a first base station 130 and a second base station 140, respectively). The first base station 130 may broadcast the first mobile network 102 in a first serving cell 150. The second base station 140 may broadcast the second mobile network 104 in a second serving cell 160. A wireless communication device 110 may be associated with (within effective boundaries of) both the first serving cell 150 and the second serving cell 160.

The wireless communication device 110 may be in communication with the first mobile network 102 through a first cellular connection 132 to the first base station 130. The first cellular connection 132 may correspond to the first RAT of the wireless communication device 110. The wireless communication device 110 may also be in communication with the second mobile network 104 through a second cellular connection 142 to the second base station 140. The second cellular connection 142 may correspond to the second RAT of the wireless communication device 110, as in a multi-SIM context. The first base station 130 may be in communication with the first mobile network 102 over a wired or wireless connection 134. The second base station 140 may be in communication with the second mobile network 104 over a wired or wireless connection 144.

In some examples, the first serving cell 150 and the second serving cell 160 may be a same serving cell (e.g., the first subscription and the second subscription may be camped on a same serving cell), and that the first base station 130 and the second base station 140 may be a same base station. In other examples, the first serving cell 150 and the second serving cell 160 may be different serving cells.

Each of the first serving cell 150 and the second serving cell 160 may have neighbor cells, such as, but not limited to, a target cell 170, first neighbor cell 180, second neighbor cell 190, or the like. A target base station 135 may be associated with the target cell 170. A first neighbor base station 185 may be associated with the first neighbor cell 180. A second neighbor base station 195 may be associated with the second neighbor cell 190.

The wireless communication device 110 may perform cell reselection/selection or handover procedures (including cell searches and measurements) on the neighbor cells 170, 180, and 190 in the idle mode and/or connected mode. Particularly, during the cell reselection, cell searches and measurements may be performed with respect to the target cell 170, first neighbor cell 180, second neighbor cell 190, as well as for any additional neighbor cells not shown. In some scenarios, the target cell 170 may be the strongest candidate or one of the strongest candidates for cell reselection. For example, the target cell 170 may have better signal strength than that of each of the first neighbor cell 180 and the second neighbor cell 190. However, reselection/selection or handover may fail for the first subscription due to various reasons, including, but not limited to, forbidden Track Area (TA), frequent System Information Block (SIB) read failures, frequent Random Access Channel (RACH) procedure failures, frequent ATTACH failures, frequent handover failures, frequency redirection failures, and/or the like.

In some examples, at least the first serving cell 150 and the second serving cell 160 may belong to a same Public Land Mobile Network (PLMN) 105. In some examples, one or more of the target cell 170, first neighbor cell 180, or second neighbor cell 190 may belong to the PLMN 105.

The first cellular connection 132 and the second cellular connection 142 may be made through two-way wireless communication links. Each of the wireless communication links may be enable by any suitable protocol (RAT) including, but not limited to, FDMA, TDMA, CDMA (e.g., EVDO), UMTS (e.g., WCDMA, LTE, HSDPA, or the like), GSM, 1×, GPRS, Wi-Fi, PCS, and/or another protocol used in a wireless communications network or a data communications network. The first cellular connection 132 may be over a same RAT as the second cellular connection 142. By way of illustrating with a non-limiting example, the first cellular connection 132 may be a LTE connection. The second cellular connection 142 may be a LTE connection. Other RATs (such as, but not limited to, WCDMA, HSDPA, EVDO, and the like) may be implemented in a similar manner, as long as the first cellular connection 132 and the second cellular connection 142 use a same RAT.

Each of the first base station 130, second base station 140, target base station 135, first neighbor base station 185, and second neighbor base station 195 may include at least one antenna group or transmission station located in the same or different areas. The at least one antenna group or transmission station may be associated with signal transmission and reception. Each of the first base station 130, second base station 140, target base station 135, first neighbor base station 185, and second neighbor base station 195 may include one or more processors, modulators, multiplexers, demodulators, demultiplexers, antennas, and the like for performing the functions described herein. In some examples, each of the first base station 130, second base station 140, target base station 135, first neighbor base station 185, and second neighbor base station 195 may be an access point, Node B, evolved Node B (eNodeB or eNB), base transceiver station (BTS), or the like.

In various examples, the wireless communication device 110 may be configured to access the first mobile network 102 and the second mobile network 104 by virtue of the multi-SIM and/or the multi-mode SIM configuration of the wireless communication device 110 (e.g., via the first cellular connection 132 and the second cellular connection 142). When a SIM corresponding to a RAT is inserted, the wireless communication device 110 may access the mobile communication network associated with that RAT based on the information stored on the SIM through registrations and call setups.

While the wireless communication device 110 is shown connected to the mobile networks 102 and 104 via two cellular connections, in other examples (not shown), the wireless communication device 110 may establish additional network connections using at least one additional RAT.

In some examples, the wireless communication device 110 may establish a wireless connection with a peripheral device (not shown) used in connection with the wireless communication device 110. For example, the wireless communication device 110 may communicate over a Bluetooth® link with a Bluetooth-enabled personal computing device (e.g., a "smart watch"). In some examples, the wireless communication device 110 may establish a wireless connection with a wireless access point (not shown), such as over a Wi-Fi connection. The wireless access point may be configured to connect to the Internet or another network over a wired connection.

Figure 2:
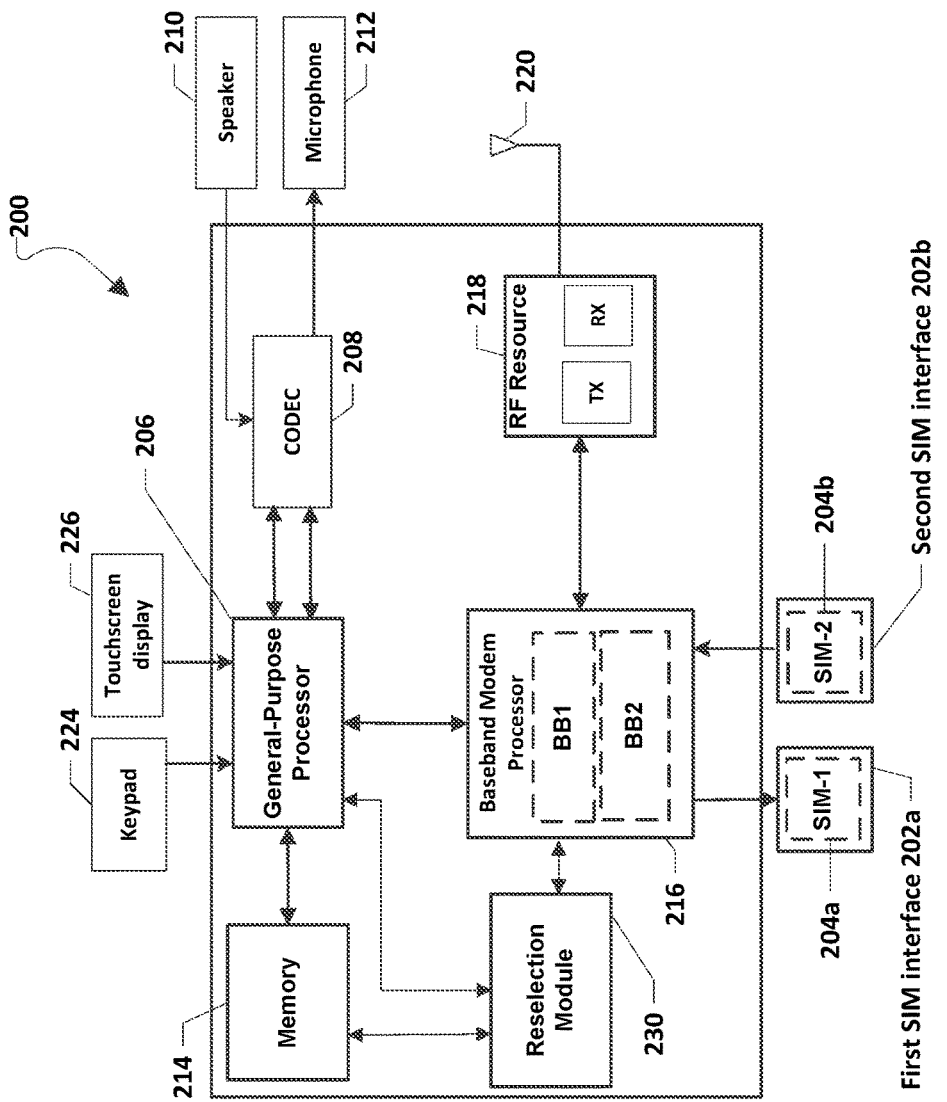
FIG. 2 is a component block diagram of an example of a wireless communication device according to various examples.

FIG. 2 is a functional block diagram of a wireless communication device 200 suitable for implementing various examples. According to various examples, the wireless communication device 200 may be the wireless communication device 110 as described with reference to FIG. 1. Referring to FIGS. 1-2, the wireless communication device 200 may include a first SIM interface 202a, which may receive a first identity module SIM-1 204a that is associated with the first mobile network 102. The wireless communication device 200 may also include a second SIM interface 202b, which may receive a second identity module SIM-2 204b that is associated with the second mobile network 104.

A SIM (e.g., SIM-1 204a, SIM-2 204b, and/or the like) in various examples may be a Universal Integrated Circuit Card (UICC) that is configured with SIM and/or Universal SIM (USIM) applications, enabling access to GSM and/or UMTS networks. The UICC may also provide storage for a phone book and other applications. Alternatively, in a CDMA network, a SIM may be a UICC removable user identity module (R-UIM) or a CDMA Subscriber Identity Module (CSIM) on a card. A SIM card may have a Central Processing Unit (CPU), Read Only Memory (ROM), Random Access Memory (RAM), Electrically Erasable Programmable Read-Only Memory (EEPROM) and Input/Output (I/O) circuits. An Integrated Circuit Card Identity (ICCID) SIM serial number may be printed on the SIM card for identification. However, a SIM may be implemented within a portion of memory of the wireless communication device 200, and thus need not be a separate or removable circuit, chip, or card.

A SIM used in various examples may store user account information, an IMSI, a set of SIM Application Toolkit (SAT) commands, and other network provisioning information, as well as provide storage space for phone book database of the user's contacts. As part of the network provisioning information, a SIM may store home identifiers (e.g., a System Identification Number (SID)/Network Identification Number (NID) pair, a Home PLMN (HPLMN) code, etc.) to indicate the SIM card network operator provider.

The wireless communication device 200 may include at least one controller, such as a general-purpose processor 206, which may be coupled to a coder/decoder (CODEC) 208. The CODEC 208 may in turn be coupled to a speaker 210 and a microphone 212. The general-purpose processor 206 may also be coupled to at least one memory 214. The general-purpose processor 206 may include any suitable data processing device, such as a microprocessor. In the alternative, the general-purpose processor 206 may be any suitable electronic processor, controller, microcontroller, or state machine. The general-purpose processor 206 may also be implemented as a combination of computing devices (e.g., a combination of a Digital Signal Processor (DSP) and a microprocessor, a plurality of microprocessors, at least one microprocessor in conjunction with a DSP core, or any other such configuration).

The memory 214 may be a non-transitory processor-readable storage medium that stores processor-executable instructions. For example, the instructions may include routing communication data relating to the first or second subscription though a corresponding baseband-RF resource chain. The memory 214 may include any suitable internal or external device for storing software and data. Examples of the memory 214 may include, but are not limited to, RAM, ROM, floppy disks, hard disks, dongles or other Recomp Sensor Board (RSB) connected memory devices, or the like. The memory 214 may store an Operating System (OS), user application software, and/or executable instructions. The memory 214 may also store application data, such as an array data structure.

The general-purpose processor 206 and the memory 214 may each be coupled to baseband modem processor 216. The SIMs (e.g., the SIM-1 204a, the SIM-2 204b, and/or the like) in the wireless communication device 200 may be associated with at least one baseband-RF resource chain. A baseband-RF resource chain may include the baseband modem processor 216, which may perform baseband/modem functions for communications on the SIMs. The baseband modem processor 216 may include one or more amplifiers and radios, referred to generally herein as a RF resource 218 or RF chain.

The examples described herein may be applicable to wireless communication devices in which the SIMs 204a and 204b share a common set of RF resource (particularly, the RF resource 218). examples described herein may also be applicable to wireless communication devices in which each of the SIMs 204a and 204b has a separate RF resource, where reselection/selection or handover failures and barring procedures may occur over SIM-1 204a before SIM-2 204b.

The RF resource 218 may include at least one transceiver that perform transmit/receive functions for the associated SIMs 204a and 204b of the wireless communication device 200. The RF resource 218 may include separate transmit and receive circuitry, or may include a transceiver that combines transmitter and receiver functions. The RF resource 218 may be coupled to a wireless antenna 220. The RF resource 218 may also be coupled to the baseband modem processor 216.

In some examples, the general-purpose processor 206, the memory 214, the baseband modem processor 216, and the RF resource 218 may be included in the wireless communication device 200 as a system-on-chip. In some examples, the SIMs 204a and 204b and their corresponding interfaces 202a, 202b may be external to the system-on-chip. Further, various input and output devices may be coupled to components on the system-on-chip, such as interfaces or controllers. Example user input components suitable for use in the wireless communication device 200 may include, but are not limited to, a keypad 224, a touchscreen display 226, and the microphone 212.

In some examples, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or to receive a telephone number. As another example, the request to initiate the outgoing call may be in the form of a voice command received via the microphone 212. Interfaces may be provided between the various software modules and functions in the wireless communication device 200 to enable communication between them.

The wireless communication device 200 may include a reselection module 230. The reselection module 230 may be configured to implement the cell-based or frequency-based de-prioritization of the target cell 170 or a target frequency in the manner described. In some examples, the reselection module 230 may be implemented within the general-purpose processor 206. For example, the reselection module 230 may be implemented as a software application stored within the memory 214 and executed by the general-purpose processor 206. Accordingly, such examples can be implemented with minimal additional hardware costs. However, other examples relate to systems and processes implemented with dedicated hardware specifically configured for performing operations described herein with respect to the reselection module 230. For example, the reselection module 230 may be implemented as a separate processing component (i.e., separate from the general-purpose processor 206). The reselection module 230 may be coupled to the memory 214, the general processor 206, the baseband processor 216, and/or the RF resource 218 for performing the function described herein.

Hardware and/or software for the functions may be incorporated in the wireless communication device 200 during manufacturing, for example, as a part of a configuration of an original equipment manufacturer (OEM) of the wireless communication device 200. In further examples, such hardware and/or software may be added to the wireless communication device 200 post-manufacture, such as by installing one or more hardware devices and/or software applications onto the wireless communication device 200.

In some examples, the wireless communication device 200 may include, among other things, additional SIM cards, SIM interfaces, at least another RF resource associated with the additional SIM cards, and additional antennas for connecting to additional mobile networks.

Figure 3:
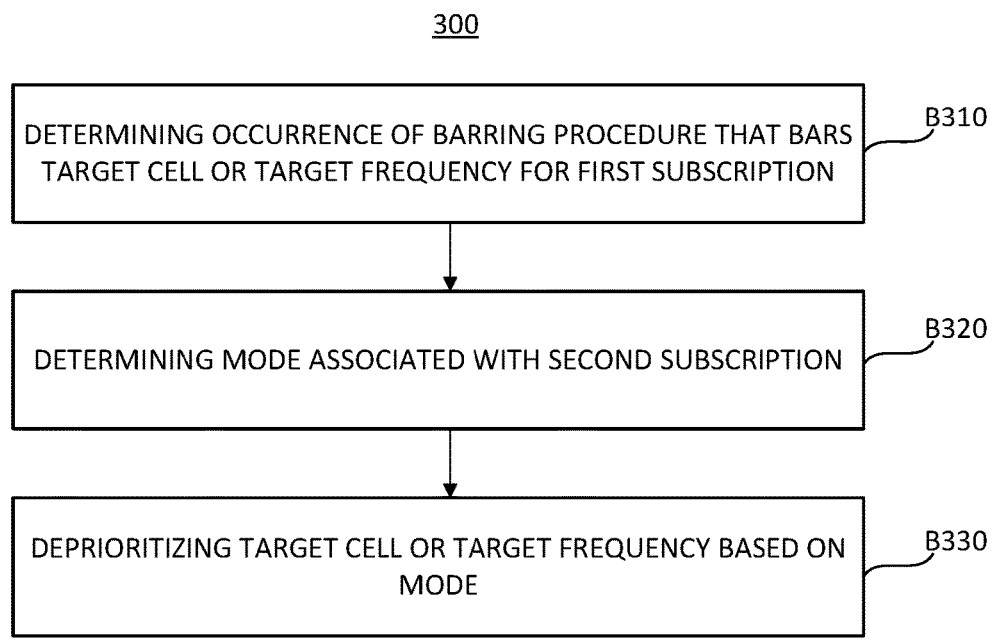
FIG. 3 is a process flowchart diagram illustrating an example of a reselection management method according to various examples.

FIG. 3 is a process flowchart diagram illustrating an example of a reselection management method 300 according to various examples. Referring to FIGS. 1-3, in some examples, the reselection management method 300 may be performed by the reselection module 230 and/or the general-purpose processor 206 of the wireless communication device 200. The first subscription may be enabled by SIM-1 204a. The second subscription may be enabled by SIM-2 204b. The first subscription and the second subscription may be camped on a same PLMN (e.g., the PLMN 105).

At block B310, the reselection module 230 and/or the general-purpose processor 206 may determine an occurrence of a barring procedure that bars the target cell 170 or target frequency for the first subscription. The target cell 170 or the target frequency may be barred (not considered for reselection/selection or handover) for a barring duration. The target cell 170 being barred for the first subscription means that the target cell 170 cannot be selected/reselected or handed over to be camped on over the first subscription by the wireless communication device 200, at least for the barring duration. Similarly, the target frequency being barred for the first subscription means that the target frequency cannot be selected/reselected or handed over to be used for the first subscription, at least for the barring duration.

Failure reasons for barring may include, but not limited to, forbidden TA, frequent SIB read failures, frequent RACH procedure failures, frequent ATTACH failures, frequent handover failures, frequency redirection failures, and/or the like.

At block B320, the reselection module 230 and/or the general-purpose processor 206 may determine a mode associated with the second subscription. The mode may be an idle mode or connected mode.

At block B330, the reselection module 230 and/or the general-purpose processor 206 may deprioritize the target cell 170 or the target frequency for reselection/selection or handover, based on the mode. That is, depending on the mode of the second subscription, different de-prioritization procedures may be performed.

Illustrating with a non-limiting example, in response to determining that the second subscription is in the idle mode, the reselection module 230 and/or the general-purpose processor 206 may perform cell-based de-prioritization for the second subscription by lowering a rank of the target cell 170 for cell searches and measurements for the barring duration. For instance, the reselection module 230 and/or the general-purpose processor 206 may rank the target cell 170 as a lowest option for cell searches and measurements for the barring duration.

Illustrating with another non-limiting example, in response to determining that the second subscription is in the idle mode, the reselection module 230 and/or the general-purpose processor 206 may perform frequency-based de-prioritization for the second subscription by lowering a cell reselection priority of the target frequency. For instance, the reselection module 230 and/or the general-purpose processor 206 may set the cell reselection priority of the target frequency as −1 for the barring duration.

Illustrating with yet another non-limiting example, in response to determining that the second subscription is in the connected mode, the reselection module 230 and/or the general-purpose processor 206 may perform cell-based de-prioritization by forbidding any measurements in the connected mode for the target cell 170 for the barring duration.

Illustrating with yet another non-limiting example, in response to determining that the second subscription is in the connected mode, the reselection module 230 and/or the general-purpose processor 206 may perform the frequency-based de-prioritization by forbidding any measurements in the connected mode for the target frequency by pruning out the target frequency for performing measurements in the connected mode.

Figure 4A:
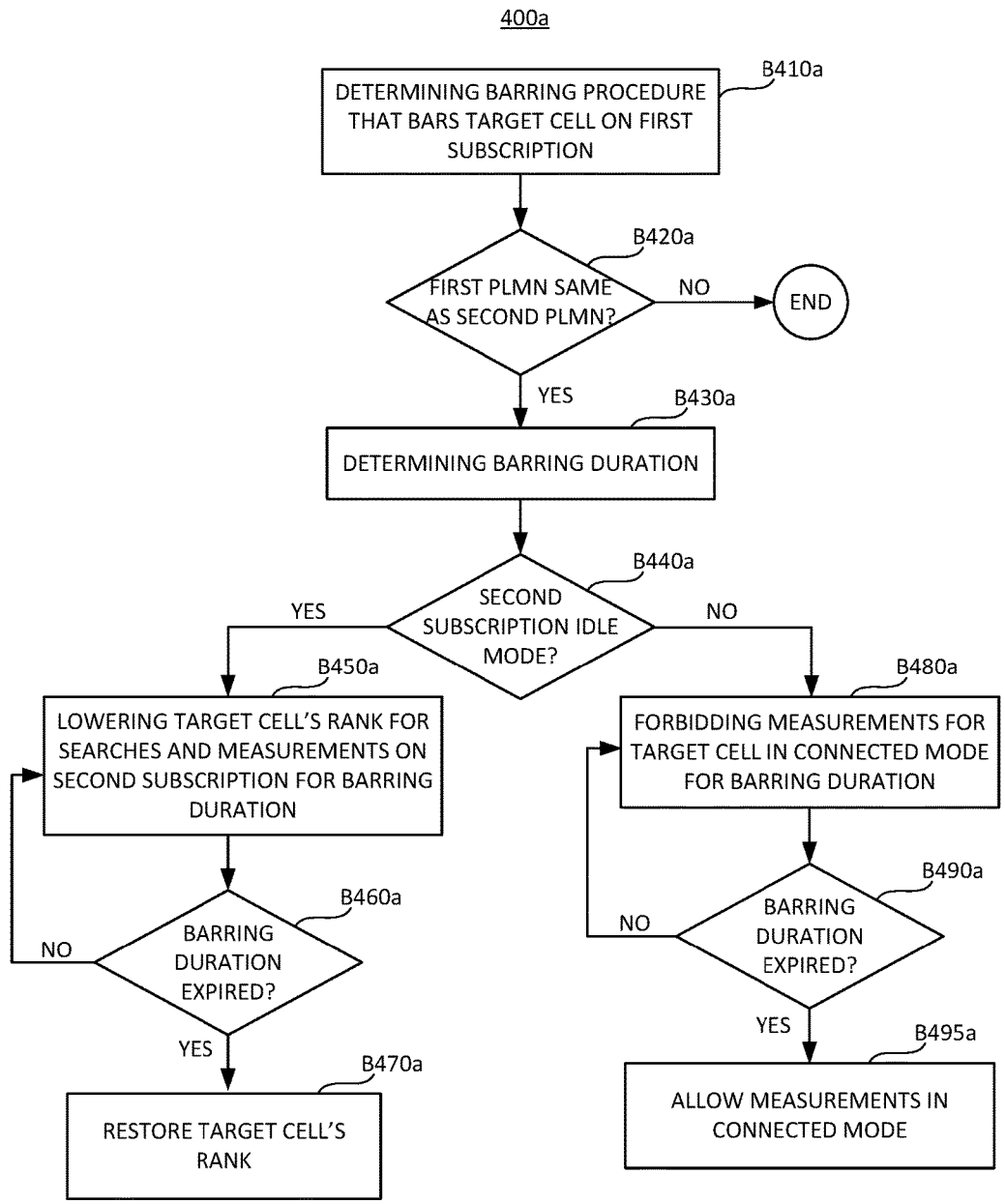
FIG. 4A is a process flowchart diagram illustrating an example of a cell reselection management method according to various examples.

FIG. 4A is a process flowchart diagram illustrating an example of a cell reselection management method 400a according to various examples. FIG. 4B is a table 400b illustrating an example of priority ranks of neighbor cells for cell searches and measurements for the second subscription in some examples. FIG. 4C is a table 400c illustrating an example of a list of forbidden neighbor cells for the second subscription in some examples. Referring to FIGS. 1-4C, each of blocks B410a-B495a may correspond to one or more of blocks B310-B330. In some examples, the cell reselection management method 400a may be performed by the reselection module 230 and/or the general-purpose processor 206 of the wireless communication device 200.

At block B410a, the reselection module 230 and/or the general-purpose processor 206 may determine that a barring procedure that bars the target cell 170 on the first subscription has occurred, in some examples. The barring procedure may bar the first subscription from camping on, searching for, and measuring any aspect of the target cell 170 for the barring duration due to any suitable failure reasons described herein.

At block B420a, the reselection module 230 and/or the general-purpose processor 206 may determine whether a first PLMN associated with the first subscription is the same as a second PLMN associated with the second subscription. The first PLMN and the second PLMN are the same when the first subscription and the second subscription are camped on the same PLMN. In some examples, this may pertain to a scenario in which the second subscription is roaming (e.g., the wireless communication device 200 is outside of the region defined by its Home PLMN (HPLMN) of the second subscription), and the roaming PLMN (e.g., the second PLMN) is the same as the first PLMN. Illustrating with a non-limiting example, each of the first PLMN and the second PLMN may be the PLMN 105.

In response to determining that the first PLMN and the second PLMN are not the same (B420a: NO), the method 400a ends. On the other hand, in response to determining that the first PLMN and the second PLMN are the same (B420a: YES), the reselection module 230 and/or the general-purpose processor 206 may determine the barring duration for which the target cell 170 is barred for the first subscription, at block B430a. In some examples, as the barring procedure is initiated for the first subscription, the reselection module 230 and/or the general-purpose processor 206 may transfer the failure reason and/or the barring duration to the second subscription in response to determining that the first PLMN and the second PLMN are the same. Illustrating with a non-limiting example, a first software layer associated with managing reselection/selection and handover with respect to the first subscription may transfer information related to a length of the barring duration to a second software layer associated with managing reselection/selection and handover with respect to the second subscription.

At block B440a, the reselection module 230 and/or the general-purpose processor 206 may determine whether the second subscription is in the idle mode. In response to determining that the second subscription is in the idle mode (B440a: YES), the reselection module 230 and/or the general-purpose processor 206 may perform the cell-based de-prioritization corresponding to the idle mode. For instance, in response to determining that the second subscription is in the idle mode, the reselection module 230 and/or the general-purpose processor 206 may lower a rank or priority of the target cell 170 for searches and measurements on the second subscription for the length of the barring duration, at block B450a. In some examples, the rank or priority of the target cell 170 may be lowered for a duration of $T_d$, where $T_d$ is set to be the same as the barring duration.

A neighbor cell having a higher rank or priority than that of other neighbor cells may be prioritized for searches and measurements as compared to the other neighbor cells, vice versa. That is, a neighbor cell having a higher rank or priority may have searches and measurements performed on it before another neighbor cell having a lower rank or priority. Illustrating with a non-limiting example set forth in the table 400b, a neighbor cell having rank x would have a higher rank or priority than that of another neighbor cell having rank x+1. The target cell 170 would have rank 1 assuming that the rank of the target cell 170 has not been lowered (pursuant to block B450a), as the target cell 170 may have a higher signal strength as compared to other neighbor cells 180 and 190. Assuming that the rank of the target cell 170 has not been lowered, the first neighbor cell 180 would have rank 2, and the second neighbor cell 190 would have rank 3.

In the non-limiting example illustrated in the table 400b, the target cell 170 is set to have the lowest rank (rank n) among all neighbor cells. The first neighbor cell 180, in the absence of a neighbor cell having a higher rank, may have rank 1 (highest rank or priority). The second neighbor cell 190 would have rank 2. In other examples, the rank of the target cell 170 may be lowered by any number greater than or equal to 1 (but not lowered to the lowest rank).

At block B460a, the reselection module 230 and/or the general-purpose processor 206 may determine whether $T_d$ (e.g., the barring duration) has expired. In response to determining that the barring duration has not expired (B460a: NO), the reselection module 230 and/or the general-purpose processor 206 may continue setting the rank of the target cell 170 to be the lowered rank, at block B450a. On the other hand, in response to determining that the barring duration has expired (B460a: YES), the reselection module 230 and/or the general-purpose processor 206 may restore the rank of the target cell 170. Illustrating with the non-limiting example of table 400b, the rank of the target cell 170 may be restored to 1 (highest rank or priority), given the signal strength of the target cell 170.

On the other hand, in response to determining that the second subscription is not in the idle mode (e.g., the second subscription is in the connected mode) (B440a: NO), the reselection module 230 and/or the general-purpose processor 206 may perform the cell-based de-prioritization corresponding to the connected mode. For instance, in response to determining that the second subscription is not in the idle mode, the reselection module 230 and/or the general-purpose processor 206 may forbid measurements for the target cell 170 in the connected mode for the barring duration.

Illustrating with a non-limiting example as set forth in the table 400c, the reselection module 230 and/or the general-purpose processor 206 may Blacklist the target cell 170 by adding the PCI (e.g., "cell_id") associated with the target cell 170 to a BlackListAddModList ("BLACKLIST"). Cell measurements in the connected mode for neighbor cells on the BLACKLIST may be forbidden. In another example, the reselection module 230 and/or the general-purpose processor 206 may prune out the frequency from connected mode measurements to avoid handover and redirection failures for $T_{dConn}$ seconds where the $T_{dConn}$ timer value is the same as that of the concerned cell's barring duration in the neighbor's subscription.

At block B490a, the reselection module 230 and/or the general-purpose processor 206 may determine whether the T325 timer value (e.g., the barring duration) has expired. In response to determining that the barring duration has not expired (B490a: NO), the reselection module 230 and/or the general-purpose processor 206 may continue forbidding the target cell 170 for connected-mode measurements, at block B480a. On the other hand, in response to determining that the barring duration has expired (B490a: YES), the reselection module 230 and/or the general-purpose processor 206 may remove the target cell 170 (its corresponding PCI) from the BLACKLIST of table 400c so that connected-mode measurements can be performed on the target cell 170.

Figure 5A:
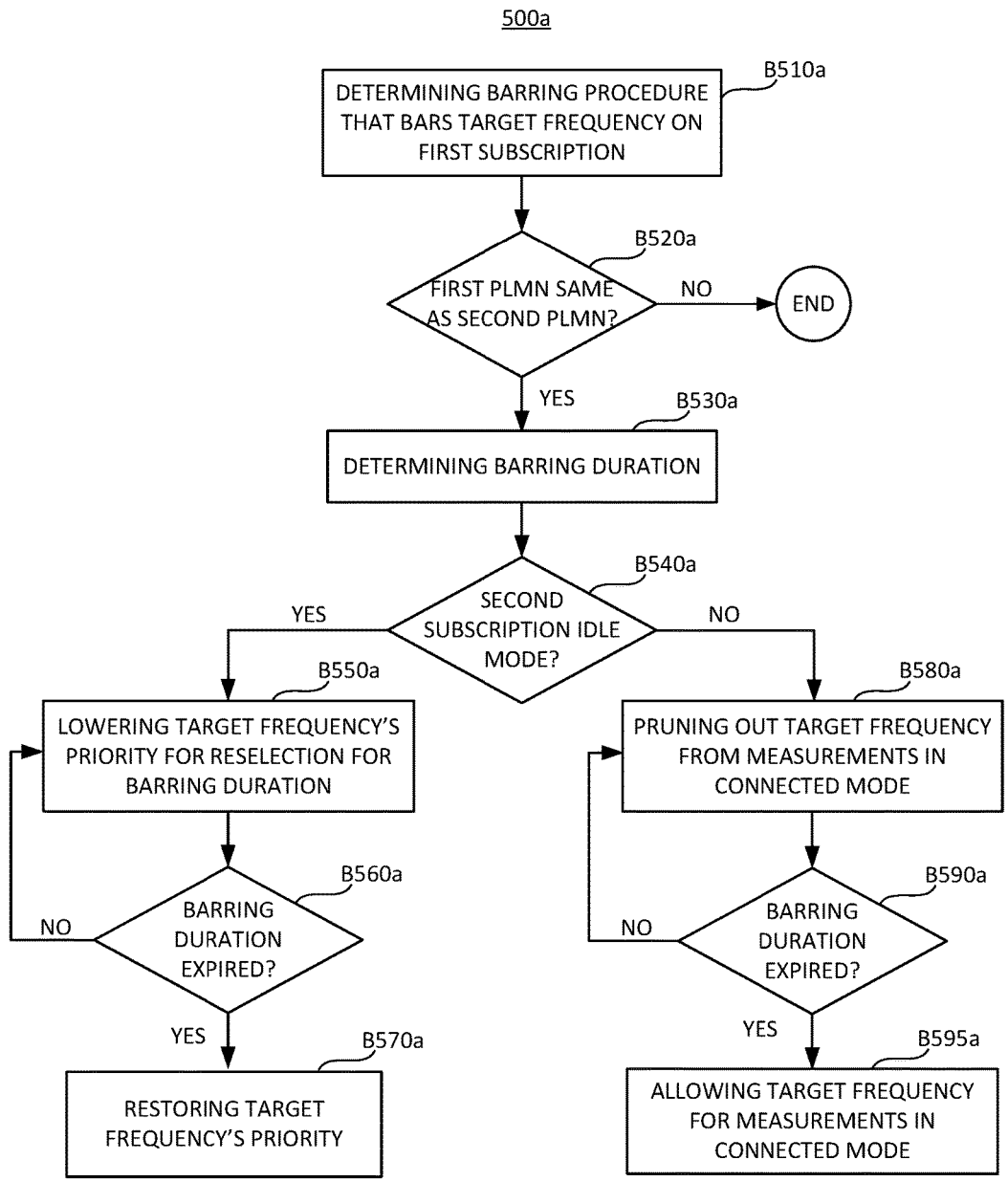
FIG. 5A is a process flowchart diagram illustrating an example of a frequency reselection management method according to various examples.

FIG. 5A is a process flowchart diagram illustrating an example of a frequency reselection management method 500a according to various examples. FIG. 5B is a table 500b illustrating an example of priority ranks of frequencies for the second subscription in some examples. FIG. 5C is a diagram 500c illustrating an example of frequency pruning for the second subscription in some examples. Referring to FIGS. 1-3 and 5A-5C, each of blocks B510a-B595a may correspond to one or more of blocks B310-B330. In some examples, the frequency reselection management method 500a may be performed by the reselection module 230 and/or the general-purpose processor 206 of the wireless communication device 200.

At block B510a, the reselection module 230 and/or the general-purpose processor 206 may determine that a barring procedure that bars a target frequency on the first subscription has occurred. The barring procedure may bar the first subscription from camping on, searching for, and measuring any aspect of the target frequency for the barring duration for any suitable reasons described herein. The target frequency may be one of the candidate frequencies for inter-frequency reselection/selection or handover. As referred to herein, "frequency" may refer to a peak frequency and/or frequency range.

At block B520a, the reselection module 230 and/or the general-purpose processor 206 may determine whether a first PLMN associated with the first subscription is the same as a second PLMN associated with the second subscription. The first PLMN and the second PLMN are the same when the first subscription and the second subscription are camped on the same PLMN. In some examples, this may pertain to a scenario in which the second subscription is roaming, and the roaming PLMN is the same as the first PLMN. Illustrating with a non-limiting example, each of the first PLMN and the second PLMN may be the PLMN 105.

In response to determining that the first PLMN and the second PLMN are not the same (B520a: NO), the method 500a ends. On the other hand, in response to determining that the first PLMN and the second PLMN are the same (B520a: YES), the reselection module 230 and/or the general-purpose processor 206 may determine the barring duration for which the target frequency is barred for the first subscription, at block B530a. In some examples, as the barring procedure is initiated for the first subscription, the reselection module 230 and/or the general-purpose processor 206 may transfer the failure reason and/or the barring duration to the second subscription in response to determining that the first PLMN and the second PLMN are the same. Illustrating with a non-limiting example, a first software layer associated with managing reselection with respect to the first subscription may transfer information related to a length of the barring duration to a second software layer associated with managing reselection with respect to the second subscription.

At block B540a, the reselection module 230 and/or the general-purpose processor 206 may determine whether the second subscription is in the idle mode. In response to determining that the second subscription is in the idle mode (B540a: YES), the reselection module 230 and/or the general-purpose processor 206 may perform the frequency-based de-prioritization corresponding to the idle mode. For instance, in response to determining that the second subscription is in the idle mode, the reselection module 230 and/or the general-purpose processor 206 may lower a priority of the target frequency for frequency reselection/selection and/or handover on the second subscription for the length of the barring duration, at block B550a. The priority of the target frequency may be lowered for a duration of T325, where T325 is set to equal the barring duration.

A frequency having a higher priority than that of other frequencies may be prioritized for inter-frequency reselection as compared to the other frequencies, and vice versa. Illustrating with a non-limiting example set forth in the table 500b, a frequency having priority level x would have a higher priority than that of another frequency having priority x−1. The target frequency would have priority level n assuming that the priority level of the target frequency has not been lowered (pursuant to block B550a), as the target frequency may have higher signal strength as compared to other frequencies (e.g., frequency A, frequency B, or the like). Assuming that the priority level of the target frequency has not been lowered, frequency A would have priority level n−1, and frequency B would have priority level n−2. The priority levels may range from −1 to 7, where 7 (n=7) indicates the highest priority level. −1 may indicate the lowest priority level. Frequency having a priority level of −1 may be used as a last resort for reselection/selection or handover, if all other frequencies having priority levels higher than −1 have failed.

In the non-limiting example illustrated in the table 500b, the target frequency may be set to have the lowest priority level (priority level−1) among all frequencies. Frequency A, in the absence of any frequencies having a higher priority level, may have priority level n (highest priority level). Frequency B may have priority level n−1. In other examples, the priority level of the target frequency may be lowered by any number greater than or equal to 1 (but not lowered to the lowest priority level).

At block B560a, the reselection module 230 and/or the general-purpose processor 206 may determine whether the barring duration has expired. In response to determining that the barring duration has not expired (B560a: NO), the reselection module 230 and/or the general-purpose processor 206 may continue setting the priority of the target frequency to be the lowered priority level, at block B550a. On the other hand, in response to determining that the barring duration has expired (B560a: YES), the reselection module 230 and/or the general-purpose processor 206 may restore the priority level of the target frequency. Illustrating with the non-limiting example of table 500b, the priority level of the target frequency may be restored to n (highest priority level), given the signal strength of the target frequency.

On the other hand, in response to determining that the second subscription is not in the idle mode (e.g., the second subscription is in the connected mode) (B540a: NO), the reselection module 230 and/or the general-purpose processor 206 may perform the frequency-based de-prioritization corresponding to the connected mode, at block B580. For instance, in response to determining that the second subscription is not in the idle mode, the reselection module 230 and/or the general-purpose processor 206 may prune out the target frequency from measurements in the connected mode for the barring duration.

Illustrating with a non-limiting example as set forth in the diagram 500c, target frequency 520c and frequencies 510c and 530c may be among the frequencies supported by the wireless communication device 200. The reselection module 230 and/or the general-purpose processor 206 may prohibit the target frequency 520c from being used for measurements in the connected mode for $T_{dConn}$, where $T_{dConn}$ may be set to equal the barring duration.

At block B590a, the reselection module 230 and/or the general-purpose processor 206 may determine whether $T_{dConn}$ (e.g., the barring duration) has expired. In response to determining that the barring duration has not expired (B590a: NO), the reselection module 230 and/or the general-purpose processor 206 may continue pruning the target frequency from connected-mode measurements, at block B580a. On the other hand, in response to determining that the barring duration has expired (B590a: YES), the reselection module 230 and/or the general-purpose processor 206 may allow the target frequency (for measurements in the connected mode, at block B595a.

FIG. 6 is a process flowchart diagram illustrating an example of a reselection management method 600 according to various examples. Referring to FIGS. 1-6, each of blocks B610 and B620 may correspond to one or more of blocks B310-B330, B410a-B495a, or B510a-B595a. In some examples, the reselection management method 600 may be performed by the reselection module 230 and/or the general-purpose processor 206 of the wireless communication device 200. The first subscription and the second subscription may be camped on a same PLMN (e.g., the PLMN 105).

At block B610, the reselection module 230 and/or the general-purpose processor 206 may determine an occurrence of a barring procedure that bars the target cell 170 or the target frequency 520c for the first subscription for the barring duration. At block B620, the reselection module 230 and/or the general-purpose processor 206 may deprioritize the target cell 170 or the target frequency 520c for the barring duration on the second subscription.

Figure 7:
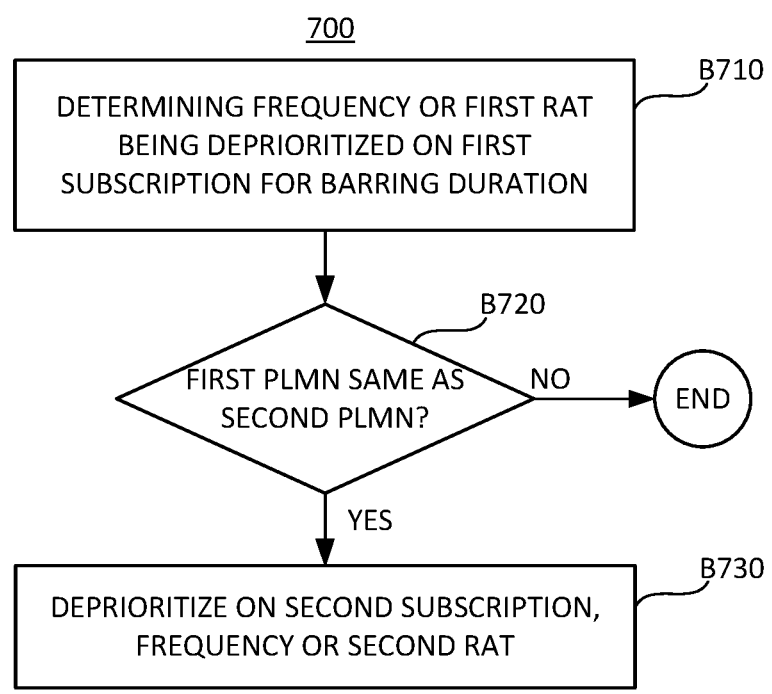
FIG. 7 is a process flowchart diagram illustrating an example of a reselection management method according to various examples.

FIG. 7 is a process flowchart diagram illustrating an example of a reselection management method 700 according to various examples. Referring to FIGS. 1-2 and 7, in some examples, the reselection management method 700 may be performed by the reselection module 230 and/or the general-purpose processor 206 of the wireless communication device 200. The first subscription and the second subscription may be camped on a same PLMN (e.g., the PLMN 105).

At block B710, the reselection module 230 and/or the general-purpose processor 206 may determine that a frequency or the first RAT being deprioritized on the first subscription for the barring duration. The frequency may refer to a serving frequency of the first subscription and/or a neighbor frequency employed by the second subscription. The first RAT may be deprioritized, for example, via the 3GPP Rel 9, De-prioritization feature in Connection reject Over-the-Air (OTA). The frequency or the first RAT may be deprioritized due to network congestion of the first mobile network 102.

At block B720, the reselection module 230 and/or the general-purpose processor 206 may determine whether the first PLMN associated with the first subscription is the same as the second PLMN associated with the second subscription. In response to determining that the first PLMN is not the same as the second PLMN (B720: NO), the method 700 ends.

On the other hand, in response to determining that the first PLMN is the same as the second PLMN (B720: YES), the reselection module 230 and/or the general-purpose processor 206 may deprioritize, on the second subscription, the frequency or the second RAT for the barring duration. For instance, in response to determining that the first PLMN is the same as the second PLMN (B720: YES), the information related to the type of the de-prioritization procedure and the barring duration may be transferred from the first software layer associated with the first subscription to the second software layer associated with the second subscription. The reselection module 230 and/or the general-purpose processor 206 may initiate the same de-prioritization procedure for the second subscription with respect to the frequency or the second RAT (which is the same as the first RAT) for the time interval T325, which is set to equal the barring duration. When T325 (or the barring duration) expires, the frequency or the second RAT may no longer be deprioritized.

Illustrating with a non-limiting example, the reselection module 230 and/or the general-purpose processor 206 may determine that the LTE RAT on the first subscription is being deprioritized on the first subscription. Upon determining that the first PLMN and the second PLMN are the same, the reselection module 230 and/or the general-purpose processor 206 may initiate the same de-prioritization procedure for the second subscription for the LTE RAT.

Figure 8:
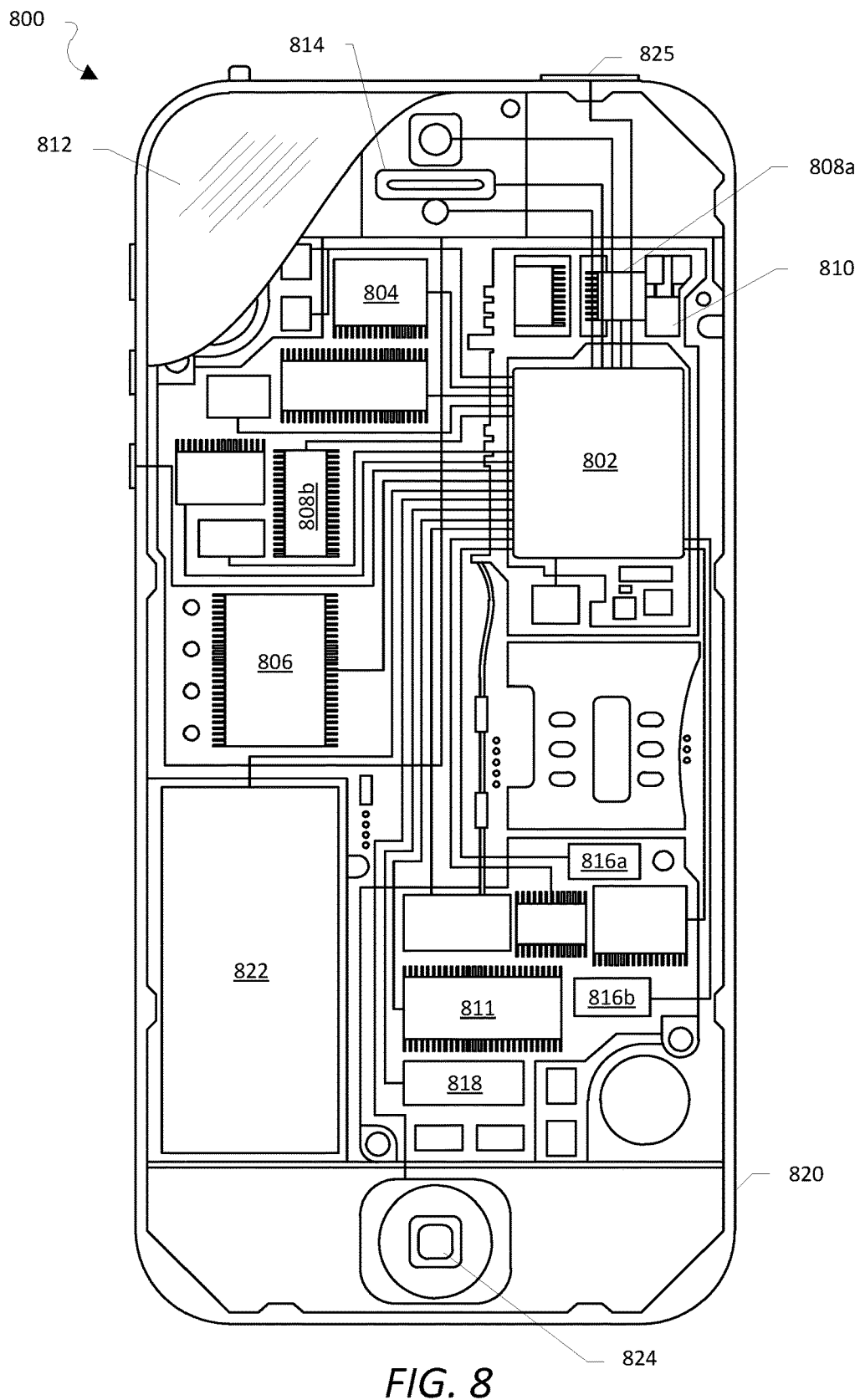
FIG. 8 is a component block diagram of a wireless communication device suitable for use with various examples.

The various examples may be implemented in any of a variety of wireless communication devices 110 and 200, an example of which is illustrated in FIG. 8, as wireless communication device 800. As such, the wireless communication device 800 may implement the process and/or the apparatus of FIGS. 1-7, as described herein.

With reference to FIGS. 1-8, the wireless communication device 800 may include a processor 802 coupled to a touchscreen controller 804 and an internal memory 806. The processor 802 may be one or more multi-core integrated circuits designated for general or specific processing tasks. The memory 806 may be volatile or non-volatile memory, and may also be secure and/or encrypted memory, or unsecure and/or unencrypted memory, or any combination thereof. The touchscreen controller 804 and the processor 802 may also be coupled to a touchscreen panel 812, such as a resistive-sensing touchscreen, capacitive-sensing touchscreen, infrared sensing touchscreen, etc. Additionally, the display of the wireless communication device 800 need not have touch screen capability.

The wireless communication device 800 may have one or more cellular network transceivers 808a, 808b coupled to the processor 802 and to at least one antenna 810 and configured for sending and receiving cellular communications. The transceivers 808a, 808b and antenna 810 may be used with the above-mentioned circuitry to implement the various methods and apparatuses. The cellular network transceivers 808a, 808b may be the RF resource 218. The antenna 810 may be the antenna 220. The wireless communication device 800 may include two or more SIM cards 816a, 816b, corresponding to SIM-1 204a (the first SIM) and SIM-2 204b (the second SIM), coupled to the transceivers 808a, 808b and/or the processor 802. The wireless communication device 800 may include a cellular network wireless modem chip 811 (e.g., the baseband modem processor 216) that enables communication via at least one cellular network and is coupled to the processor 802.

The wireless communication device 800 may include a peripheral device connection interface 818 coupled to the processor 802. The peripheral device connection interface 818 may be singularly configured to accept one type of connection, or multiply configured to accept various types of physical and communication connections, common or proprietary, such as USB, FireWire, Thunderbolt, or PCIe. The peripheral device connection interface 818 may also be coupled to a similarly configured peripheral device connection port (not shown).

The wireless communication device 800 may also include speakers 814 for providing audio outputs. The wireless communication device 800 may also include a housing 820, constructed of a plastic, metal, or a combination of materials, for containing all or some of the components discussed herein. The wireless communication device 800 may include a power source 822 coupled to the processor 802, such as a disposable or rechargeable battery. The rechargeable battery may also be coupled to a peripheral device connection port (not shown) to receive a charging current from a source external to the wireless communication device 800. The wireless communication device 800 may also include a physical button 824 for receiving user inputs. The wireless communication device 800 may also include a power button 826 for turning the wireless communication device 800 on and off.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present examples.

The hardware used to implement the various illustrative logics, logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present examples. Various modifications to these examples will be readily apparent to those skilled in the art, and the generic principles defined herein may be applied to some examples without departing from the spirit or scope of the examples. Thus, the present examples are not intended to be limited to the examples shown herein but are to be accorded the widest scope consistent with the following claims and the principles and novel features disclosed herein.

What is claimed is:

1. A method for managing cell reselection for a wireless communication device having a first subscription associated with a first Subscriber Identity Module (SIM) and a second subscription associated with a second SIM, the method comprising:
   determining an occurrence of a barring procedure associated with at least one of a target cell or a target frequency for the first subscription;
   determining a mode associated with the second subscription, wherein the mode is at least one of a connected mode or an idle mode;
   deprioritizing the at least one target cell or target frequency for use with the second subscription by a first procedure based on the determination that the mode associated with the second subscription is the connected mode; and
   deprioritizing the at least one target cell or target frequency for use with the second subscription by a second procedure based on the determination that the mode associated with the second subscription is the idle mode, wherein the first procedure is different from the second procedure.

2. The method of claim 1, further comprising:
   determining a barring duration in which the at least one target cell or target frequency is not considered for a reselection procedure for the first subscription.

3. The method of claim 2, wherein the mode associated with the second subscription is the idle mode.

4. The method of claim 3, wherein the second procedure comprises:
   lowering a rank associated with the target cell for cell searches and measurements for the barring duration.

5. The method of claim 4, wherein the rank associated with the target cell is set to a lowest priority for cell searches and measurements for the barring duration.

6. The method of claim 3, wherein the second procedure comprises:
   lowering a cell reselection priority of the target frequency for the barring duration.

7. The method of claim 6, wherein the cell reselection priority of the target frequency is set to a lowest priority for the barring duration.

8. The method of claim 2, wherein the second subscription is in the connected mode.

9. The method of claim 8, wherein first procedure comprises:
   blacklisting the target cell to forbid measurements associated with the target cell for the barring duration.

10. The method of claim 9, wherein the blacklisting comprises:
    adding a Primary Cell Index (PCI) identifying the target cell to a BlackListAddModList.

11. The method of claim 8, wherein the first procedure comprises:
    removing the target frequency from measurements for the barring duration.

12. The method of claim 2, further comprising:
    determining whether a first Public Land Mobile Network (PLMN) associated with the first subscription is the same as a second PLMN associated with the second subscription; and
    transferring the barring duration from a first software layer associated with the first subscription to a second software layer associated with the second subscription in response determining that the first PLMN is the same as the second PLMN.

13. The method of claim 1, wherein:
    the first SIM corresponds to a first Radio Access Technology (RAT);
    the second SIM corresponds to a second RAT; and
    the first RAT and the second RAT are the same.

14. The method of claim 13, further comprising:
    determining that the first subscription is being deprioritized; and
    deprioritizing the second subscription.

15. The method of claim 14, further comprising:
   determining whether a first Public Land Mobile Network (PLMN) associated with the first subscription is the same as a second PLMN associated with the second subscription; and
   transferring information related to the first subscription being deprioritized from a first software layer associated with the first subscription to a second software layer associated with the second subscription in response determining that the first PLMN is the same as the second PLMN.

16. The method of claim 1, wherein:
   the first SIM corresponds to a first RAT;
   the second SIM corresponds to a second RAT; and
   each of the first RAT and the second RAT is Long Term Evolution (LTE).

17. A wireless communication device, comprising:
   at least one radio frequency (RF) resource;
   a first Subscriber Identity Module (SIM) associated with a first subscription;
   a second SIM associated with a second subscription;
   a processor;
   a memory storing instructions that, when executed by the processor, cause the wireless communication device to:
      determine an occurrence of a barring procedure associated with at least one of a target cell or a target frequency of the first subscription;
      determine a mode associated with the second subscription, wherein the mode is at least one of a connected mode or an idle mode;
      deprioritize the at least one target cell or target frequency for use with the second subscription by a first procedure based on the determination that the mode associated with the second subscription is the connected mode; and
      deprioritize the at least one target cell or target frequency for use with the second subscription by a second procedure based on the determination that the mode associated with the second subscription is the idle mode, wherein the first procedure is different from the second procedure.

18. The wireless communication device of claim 17, wherein execution of the instructions causes the wireless communication device to further:
   determine a barring duration in which the at least one target cell or target frequency is not considered for a reselection procedure for the first subscription.

19. The wireless communication device of claim 18, wherein the mode associated with the second subscription is the idle mode.

20. The wireless communication device of claim 19, wherein execution of the instructions to deprioritize by the second procedure causes the wireless communication device to further:
   lower a rank associated with the target cell for cell searches and measurements for the barring duration.

21. The wireless communication device of claim 20, wherein the rank associated with the target cell is set to a lowest priority for cell searches and measurements for the barring duration.

22. The wireless communication device of claim 19, wherein execution of the instructions to deprioritize by the second procedure causes the wireless communication device to further:
   lower a cell reselection priority of the target frequency for the barring duration.

23. The wireless communication device of claim 22, wherein the cell reselection priority of the target frequency is set to a lowest priority for the barring duration.

24. The wireless communication device of claim 18, wherein the second subscription is in the connected mode.

25. The wireless communication device of claim 24, wherein execution of the instructions to deprioritize by the first procedure causes the wireless communication device to further:
   blacklist the target cell to forbid measurements associated with the target cell for the barring duration.

26. The wireless communication device of claim 25, wherein execution of the instructions to blacklist causes the wireless communication device to:
   add a Primary Cell Index (PCI) to identify the target cell to a BlackListAddModList.

27. A method for managing reselection for a wireless communication device having a first subscription associated with a first Radio Access Technology (RAT) and a second subscription associated with a second RAT, the method comprising:
   determining an occurrence of a barring procedure associated with at least one of a target cell or a target frequency for the first subscription for a barring duration;
   determining a mode associated with the second subscription, wherein the mode is at least one of a connected mode or an idle mode;
   deprioritizing the at least one target cell or the target frequency for the barring duration for use with the second subscription by a first procedure based on the determination that the mode associated with the second subscription is the connected mode; and
   deprioritizing the at least one target cell or the target frequency for the barring duration for use with the second subscription by a second procedure based on a determination that the mode associated with the second subscription is the idle mode, wherein the first procedure is different from the second procedure.

28. A method for managing reselection for a wireless communication device having a first subscription associated with a first Radio Access Technology (RAT) and a second subscription associated with a second RAT, the method comprising:
   determining that a first frequency of the first RAT is deprioritized for the first subscription for a barring duration;
   determining whether a first Public Land Mobile Network (PLMN) associated with the first subscription is the same as a second PLMN associated with the second subscription;
   deprioritizing the first frequency of the second RAT for use with the second subscription in response to determining that the first PLMN and the second PLMN are the same by a first procedure based on a determination that a mode associated with the second subscription is a connected mode; and
   deprioritizing the first frequency of the second RAT for use with the second subscription in response to determining that the first PLMN and the second PLMN are the same by a second procedure based on a determination that the mode associated with the second subscription is an idle mode, wherein the first procedure is different from the second procedure.

29. The method of claim 28, wherein the first RAT and the second RAT and the same.

30. The method of claim 28, wherein the first frequency of the first RAT is deprioritized due to network congestion.

* * * * *